(12) United States Patent
Nishimura et al.

(10) Patent No.: US 8,465,874 B2
(45) Date of Patent: Jun. 18, 2013

(54) LITHIUM-ION SECONDARY BATTERY AND MANUFACTURING METHOD THEREOF

(75) Inventors: Naoto Nishimura, Kashihara (JP);
Motoaki Nishijima, Nara (JP);
Shinsuke Kobayashi, Katsuragi (JP)

(73) Assignee: Sharp Kabushiki Kaisha, Osaka (JP)

( * ) Notice: Subject to any disclaimer, the term of this patent is extended or adjusted under 35 U.S.C. 154(b) by 2437 days.

(21) Appl. No.: 11/398,638

(22) Filed: Apr. 6, 2006

(65) Prior Publication Data
US 2007/0003837 A1    Jan. 4, 2007

(30) Foreign Application Priority Data
Apr. 7, 2005 (JP) .................................. 2005-110521

(51) Int. Cl.
*H01M 4/13* (2010.01)
*H01M 4/58* (2010.01)
*H01M 4/62* (2006.01)
*H01M 4/80* (2006.01)

(52) U.S. Cl.
USPC ......... 429/232; 429/217; 429/235; 429/231.8

(58) Field of Classification Search
USPC ................. 429/232, 217, 235, 231.8
See application file for complete search history.

(56) References Cited

U.S. PATENT DOCUMENTS

| | | | |
|---|---|---|---|
| 6,083,645 A * | 7/2000 | Takeuchi et al. | 429/231.8 |
| 6,214,490 B1 * | 4/2001 | Pate | 429/94 |
| 6,506,518 B1 * | 1/2003 | Kobayashi et al. | 429/231.1 |
| 6,723,471 B2 * | 4/2004 | Kitagawa et al. | 429/231.8 |
| 6,855,459 B2 * | 2/2005 | Matsubara et al. | 429/217 |
| 2001/0033822 A1 * | 10/2001 | Ishii et al. | 423/448 |
| 2002/0009643 A1 * | 1/2002 | Torata et al. | 429/223 |
| 2002/0028379 A1 * | 3/2002 | Okada et al. | 429/137 |
| 2002/0106566 A1 * | 8/2002 | Nemoto et al. | 429/224 |
| 2002/0187395 A1 * | 12/2002 | Kitoh | 429/231.1 |
| 2003/0235762 A1 * | 12/2003 | Fukui et al. | 429/231.95 |
| 2004/0023115 A1 * | 2/2004 | Kato et al. | 429/231.8 |
| 2004/0062995 A1 * | 4/2004 | Yanagida et al. | 429/331 |
| 2004/0076883 A1 * | 4/2004 | Aoshima et al. | 429/223 |
| 2004/0151837 A1 * | 8/2004 | Morita et al. | 427/372.2 |

FOREIGN PATENT DOCUMENTS

| | | |
|---|---|---|
| JP | 61-111907 | 5/1986 |
| JP | 11-322314 | 11/1999 |
| JP | 2001-040548 | 2/2001 |

\* cited by examiner

*Primary Examiner* — Eugenia Wang
(74) *Attorney, Agent, or Firm* — Nixon & Vanderhye P.C.

(57) ABSTRACT

In a lithium-ion secondary battery of the present invention, the electrical resistivity of the mixture of a positive electrode active material, an electrically conductive member, and a binder is 0.1 Ωcm or more but 1 Ωcm or less. The positive and negative electrodes each have an electrical capacity of 10 mAh or more but 50 mAh or less per volume of a rectangular parallelepiped that has a 1 cm² square base on a face of the electrode of one polarity facing the electrode of the other polarity and that has a height equal to the thickness of the electrode of the one polarity at the square base. Used as the negative electrode thereof is a negative electrode formed by sintering graphite powder, non-graphitizing carbon, and fibrous powder retained in the pores of a porous metal structure in an inert gas atmosphere at a temperature of between 600 and 1000° C.

21 Claims, 4 Drawing Sheets

LITHIUM-ION SECONDARY BATTERY AND MANUFACTURING METHOD THEREOF

This nonprovisional application claims priority under 35 U.S.C. §119(a) on Patent Application No. 2005-110521 filed in Japan on Apr. 7, 2005, the entire contents of which are hereby incorporated by reference.

BACKGROUND OF THE INVENTION

1. Field of the Invention

The present invention relates to an electric power storage lithium-ion secondary battery, and more particularly to a lithium-ion secondary battery using a sintered negative electrode and a manufacturing method thereof.

2. Description of Related Art

Secondary batteries are nowadays widely used as power sources for cellular phones, notebook computers, digital cameras, and compact video cameras, for example. Among various types of secondary batteries, lithium-ion secondary batteries have been increasingly widespread that use, for example, lithium cobaltate ($LiCoO_2$), lithium nickelate ($LiNiO_2$), Li ($Co_{1-x}Ni_x$)$O_2$ that is a solid solution thereof, or $LiMn_2O_4$ having a spinel structure as a positive electrode material, and use a carbon material such as graphite as a negative electrode material, and that use an electrolyte which is a lithium compound (a solute) in a liquid organic compound (a solvent).

When a lithium-ion secondary battery charges, a lithium atom (Li) in a lithium transition metal oxide, which is a positive electrode active material, turns into a lithium ion ($Li^+$) and then slides in between the carbon layers of the negative electrode (intercalation), and, when the lithium-ion secondary battery discharges, the lithium ion ($Li^+$) slides out between the carbon layers (deintercalation), then moves toward the positive electrode, and then turns back to the lithium compound. In this way, a charge/discharge reaction proceeds. In addition to such advantages as having a higher output voltage and a higher energy density than a nickel-cadmium battery and a nickel hydride battery, the advantage of this lithium-ion secondary battery is that it has no "memory effect", which is an effect associated with a cycle of a shallow discharge and a subsequent recharge, resulting in a decrease in the apparent discharge capacity.

In such a lithium-ion secondary battery, electrodes are formed by applying an active material on a metal leaf, and then the battery is formed by stacking or winding up the electrodes thus formed. Conventionally, the lithium-ion secondary battery is mainly used as a power source for a portable device. In recent years, however, attempts have been made to achieve a larger lithium-ion secondary battery having a capacity of 5 Ah or more for electric power storage purposes.

The lithium-ion secondary battery is known not only for its high output voltage and high energy density as described above, but also known as having a high energy efficiency (discharge electric power/charge electric power), and these properties are desirable for an electric power storage battery. However, the lithium-ion secondary battery does not satisfactorily meet users' demands in terms of the number of charge and discharge cycles, that is, a cycle life, and therefore needs to be improved. A longer cycle life of the lithium-ion secondary battery is particularly required when it is used for energy storage purposes or used as an electric power source for an electric automobile.

On the other hand, when adhering to a conventional method of manufacturing the above-described small battery, electrodes are formed by applying an active material onto a metal leaf and attaching it there by pressurizing, and then the electrodes thus formed are wound up or stacked. However, manufacturing a large battery by this method would require more complicated manufacturing procedures than a small battery when winding up or stacking the electrodes, because the large battery has a greater capacity and a wider electrode area than the small one, and thus inconveniently leads to a greatly reduced manufacturing efficiency.

Specifically, in a currently commercially available small lithium-ion secondary battery having a capacity of 3 Ah or less, the capacity per unit electrode area offered by an active material thereof is between 2 $mAh/cm^2$ and 3 $mAh/cm^2$ to achieve satisfactory load characteristics. If this small lithium-ion secondary battery is used to form a large battery having a capacity of 5 Ah or more, the required electrode area would be between 1600 $cm^2$ and 2500 $cm^2$. The necessity of such an electrode with a very wide area requires the electrodes to be stacked or wound up, and furthermore it is necessary to stack a large number of electrodes or wind up the electrodes an increased number of times. On top of that, allowing a battery to have a capacity of 5 Ah or more increases the required electrode area, making it difficult to manufacture an electrode itself.

In the present specification, the "capacity per unit area" of an electrode and the "weight of the active material per unit area" of the electrode are defined as follows. On the face of a positive or negative electrode facing an electrode of the opposite polarity, suppose a 1 $cm^2$ square and then suppose the volume of a rectangular parallelepiped having that square as its bottom side and having a height equal to the thickness of the electrode. Then the capacity of the electrode and the weight of the active material contained in the electrode as measured per such unit volume are referred to as the "capacity per unit area" of the electrode and the "weight of the active material per unit area" thereof respectively. Note that the unit of the "capacity per unit area" is "$mAh/cm^2$".

On the other hand, the mere increase in size of a lithium-ion secondary battery raises the level of energy to be stored in the lithium-ion secondary battery, resulting in, for example, a high current flow when the positive and negative electrodes are short-circuited together. This indicates that there are not enough safety measures in place to deal with abnormal events.

A method is disclosed in JP-A-H11-322314 (hereinafter referred to as Patent Publication 1) that prevents a short circuit at the time of forming a battery by forming a negative electrode for a nonaqueous secondary battery by applying slurry onto a copper foil—the slurry prepared by mixing together carbon fiber powder as a negative electrode active material, acetylene black as an electrically conductive member, and polyvinylidene fluoride as a binder, then adding N-methylpyrrolidone thereto, and then kneading them together—and then drying it. Moreover, a technique is disclosed in JP-A-2001-40548 (hereinafter referred to as Patent Publication 2) that achieves a high-capacity secondary battery by using carbon fiber obtained by sintering cellulose fiber together with calcium carbonate containing magnesium carbonate at 800° C. or more as a material of an electrode for an electric double layer capacitor.

However, Patent Publications 1 and 2 do not describe how to improve a cycle life of a lithium-ion secondary battery, and therefore it is not possible to address the above-described challenges of realizing a lithium-ion secondary battery having a longer cycle life as well as a higher-capacity.

SUMMARY OF THE INVENTION

In view of the conventionally experienced problems described above, it is an object of the present invention to provide a lithium-ion secondary battery that is a large battery having a capacity of 5 Ah or more, that has a good high-current discharge performance, and that suffers less from deterioration of a charge/discharge cycle life.

To achieve the above object, according to one aspect of the present invention, a lithium-ion secondary battery having a battery capacity of 5 Ah or more is provided with: a positive electrode including a positive electrode active material, an electrically conductive member, a binder, and a charge collecting member; a negative electrode including a negative electrode active material, an electrically conductive member, a binder, and a charge collecting member; and an electrolyte containing an electrolytic salt. In this lithium-ion secondary battery, the electrical resistivity of the mixture of the positive electrode active material, the electrically conductive member, and the binder is 0.1 Ωcm or more but 1 Ωcm or less. The positive and negative electrodes each have an electrical capacity of 10 mAh or more but 50 mAh or less per volume of a rectangular parallelepiped that has a 1 cm² square base on a face of the electrode of one polarity facing the electrode of the other polarity and that has a height equal to the thickness of the electrode of the one polarity at the square base. The negative electrode is formed by sintering negative electrode ingredients including graphite powder, non-graphitizing carbon, and fibrous powder in pores of a porous metal structure used as the charge collecting member.

With this structure, it is possible to achieve a lithium-ion secondary battery having a battery capacity of 5 Ah or more that is compact in size and easy to manufacture, that suffers less from deterioration of a charge/discharge cycle life, and that has a good high-current discharge performance.

According to the present invention, in the lithium-ion secondary battery structured as described above, the porosity of the porous metal structure is 75% or more but 98% or less.

With this structure, it is possible to achieve a high-capacity lithium-ion secondary battery having a battery capacity of 5 Ah or more that has a high energy density and can maintain the shape of the electrode and ensure thermal dissipation.

According to the present invention, in the lithium-ion secondary battery structured as described above, the porous metal structure is formed of a material selected from the group consisting of iron, cobalt, nickel, and an alloy thereof.

With this structure, a catalytic effect of these metals on graphitization gives an interface between the porous metal structure and the carbon material used as the active material a mechanically very strong structure, and whereby the porous metal structure and the active material are bonded together without being separated even when charge/discharge cycles are repeated over an extended period of time.

According to the present invention, in the lithium-ion secondary battery structured as described above, the porous metal structure is nickel foam.

With this structure, by using as a porous metal structure nickel foam that is industrially available and has a catalytic activity for graphitization, it is possible to provide at low cost a lithium-ion secondary battery having a good charge/discharge cycle performance.

According to the present invention, in the lithium-ion secondary battery structured as described above, the non-graphitizing carbon is a carboxymethylcellulose polymer or a polymer of carboxymethylcellulose derivative.

With this structure, using a water-soluble carboxymethylcellulose polymer or water-soluble polymer of carboxymethylcellulose derivative makes it easy to make the negative electrode material into a paste and rub the paste thus obtained into the porous metal structure.

According to the present invention, in the lithium-ion secondary battery structured as described above, the fibrous powder is powder of highly graphitized carbon fiber.

With this structure, the carbon fiber not only contributes to the electron conductivity thereof by making contact with the particles of graphite powder inside the negative electrode, but also behaves as an electrode active material by itself. This makes it possible to achieve a high-capacity lithium-ion secondary battery.

According to the present invention, in the lithium-ion secondary battery structured as described above, the fiber diameter of the fibrous powder is between 0.1 and 80 μm.

With this structure, it is possible to give the fibrous powder a mechanical strength sufficient to maintain contact between the particles of graphite powder, and make it easy for the fibrous powder to fit into the pores of the porous metal structure.

According to the present invention, in the lithium-ion secondary battery structured as described above, the graphite powder exhibits, when subjected to wide-angle X-ray diffractometry, an average interplanar spacing of (002) plane of between 0.335 and 0.340 nm, a crystallite thickness in (002) plane direction of 10 nm or more, and a crystallite thickness in (110) plane direction of 10 nm or more.

With this structure, the potential during lithium deintercalation becomes closer to the potential of lithium. This makes it possible to achieve a high-capacity carbon electrode.

According to the present invention, in the lithium-ion secondary battery structured as described above, the particle size of the graphite powder is 80 μm or less.

With this structure, the area of contact between the graphite powder and an electrolytic solution increases, making it possible to achieve a lithium-ion secondary battery that does not suffer from, for example, diffusion of lithium inside the particle or reduction in the number of reaction sites when charged/discharged at high current.

According to the present invention, in the lithium-ion secondary battery structured as described above, the sintering temperature of the negative electrode is between 600 and 1000° C.

With this structure, the graphite powder, the non-graphitizing carbon, and the fibrous powder are sintered and thus integrated together in the pores of the porous metal structure, giving an interface thereof a strong mechanical structure. This gives the lithium-ion secondary battery a dramatically improved charge/discharge cycle performance.

According to another aspect of the present invention, a method of manufacturing a lithium-ion secondary battery includes the steps of: forming a negative electrode by mixing together negative electrode ingredients including graphite powder, non-graphitizing carbon, and fibrous powder, adding thereto a solvent so as to obtain a paste, rubbing the paste thus obtained into pores of a porous metal structure, and sintering the product thus obtained at a temperature of between 600 and 1000° C.; forming a positive electrode by mixing together positive electrode ingredients including a positive electrode active material, an electrically conductive member, and a binder, dissolving the mixture thus obtained in a solvent so as to prepare slurry, injecting the slurry thus prepared into a charge collecting member, and drying the product thus obtained; and assembling a battery by inserting, into a covering material, the positive electrode and the negative electrode stacked with a separator interposed therebetween so as not to make electrical contact with each other, injecting an electrolytic solution thereinto, and then sealing the covering material.

With this structure, it is possible to manufacture at low cost with a simple procedure a lithium-ion secondary battery having a battery capacity of 5 Ah or more that suffers less from deterioration of a charge/discharge cycle life and has a good high-current discharge performance.

DETAILED DESCRIPTION OF PREFERRED EMBODIMENTS

Figure 1:
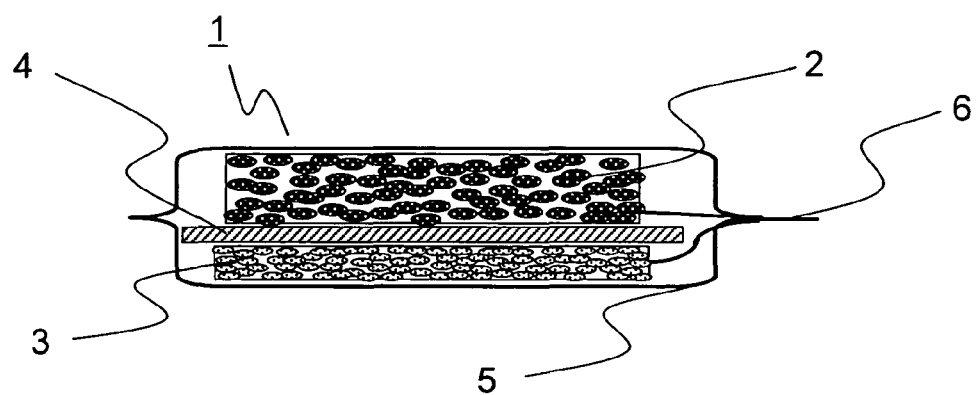
FIG. 1 is a schematic sectional view of the lithium-ion secondary battery of the present invention provided with one positive electrode and one negative electrode.

The lithium-ion secondary battery of the present invention is characterized as follows. It is provided with a positive electrode, a negative electrode, and an electrolyte containing an electrolytic salt. The electrical resistivity of the mixture of a positive electrode active material, an electrically conductive member, and a binder, each being a positive electrode ingredient, is 0.1 Ωcm or more but 1 Ωcm or less. The positive and negative electrodes each have an electrical capacity of 10 mAh or more but 50 mAh or less per volume of a rectangular parallelepiped that has a 1 $cm^2$ square base on a face of the electrode of one polarity facing the electrode of the other polarity and that has a height equal to the thickness of the electrode of the one polarity at the square base. Used as a negative electrode thereof is a carbon electrode formed by sintering the mixture including graphite powder, non-graphitizing carbon, and fibrous powder in pores of a porous metal structure.

For example, when a lithium-ion secondary battery composed of one positive electrode and one negative electrode is so designed as to have a capacity per unit electrode area of less than 10 mAh/$cm^2$, the electrode area required for forming a battery having a capacity of 5 Ah or more exceeds 500 $cm^2$, resulting in a lithium-ion secondary battery with a large area. To make such a battery compact, it is necessary to stack a large number of electrodes or wind up the electrodes many times. This not only makes the manufacturing procedures complicated and reduces the manufacturing efficiency, but also deteriorates the heat dissipation characteristics of the lithium-ion secondary battery.

On the other hand, when the capacity per unit area is larger than 50 mAh/$cm^2$, the amount of current per unit area associated with charge/discharge increases, and the resistance component of the electrode increases, making higher the polarization of the battery. This extremely deteriorates the discharge load characteristics of the lithium-ion secondary battery. Therefore, it is preferable that the capacity per unit area of the electrode be 10 mAh/$cm^2$ or more but 50 mAh/cm or less.

As described above, to increase the capacity per unit electrode area to between 10 mAh/$cm^2$ and 50 mAh/$cm^2$, it is necessary to increase the weight of the active material per unit electrode area. However, increasing the weights of the positive and negative electrode active materials per unit electrode area makes thicker the positive and negative electrode active materials formed on the surface of a charge collecting member. As a result, the positive electrode and negative electrode active materials are formed not only in the vicinity of the surface of the charge collecting member but also in the portion away from the surface thereof. This increases the electric resistance component inside the electrodes, leading to deterioration in load characteristics of the lithium-ion secondary battery.

Thus, by reducing the electrical resistivity of the mixture of a positive electrode active material, an electrically conductive member, and a binder to 1 Ωcm or less, it is possible to obtain a lithium-ion secondary battery having useful load characteristics for electric power storage purposes. Moreover, when the electrical resistivity of the mixture of the positive electrode active material, the electrically conductive member, and the binder is 0.1 Ωcm or more, a short-circuit current flowing when the positive and negative electrodes are short-circuited together is suppressed, making it possible to ensure safety.

The negative electrode used in the lithium-ion secondary battery of the present invention is formed by mixing together negative electrode ingredients including graphite powder, non-graphitizing carbon, and fibrous powder, and then sintering the mixture thus obtained in pores of a porous metal structure used as the charge collecting member.

The graphite powder behaves as a principal ingredient of the negative electrode active material. The graphite powder used in the present invention is a material having a structure such that, when subjected to wide-angle X-ray diffractometry, it exhibits an average interplanar spacing (d002) of (002) plane of between 0.335 and 0.340 nm, a crystallite thickness (Lc) in (002) plane direction of 10 nm or more, and a crystallite thickness (La) in (110) plane direction of 10 nm or more. By using this material, it is possible to obtain a high-capacity electrode.

Factors influencing the capacity and the charge/discharge potential include properties of the layer structure of carbon. The properties of the layer structure of carbon include an interplanar spacing (d002) of (002) plane, i.e., an interlayer distance, and a crystallite size. As the degree of crystallinity increases, the potential during lithium deintercalation becomes closer to the potential of lithium. By doing so, it can be expected to obtain a higher-capacity carbon electrode.

Therefore, when the battery capacity provided by the fabricated lithium-ion secondary battery is taken into consideration, it is preferable that an average interplanar spacing (d002) of (002) plane observed by wide-angle X-ray diffractometry be between 0.335 and 0.340 nm. On the other hand, a crystallite thickness (Lc) in (002) plane direction of 10 nm or less results in low crystallinity. This reduces the battery capacity provided by the lithium-ion secondary battery, thus making it impractical. Similarly, a crystallite thickness (La) in (110) plane direction of 10 nm or less results in low crystallinity. This reduces the battery capacity provided by the lithium-ion secondary battery, thus making it impractical.

Moreover, in the present invention, it is preferable to use graphite having an R value (the ratio of the peak intensity at 1360 cm-1 to that at 1580 cm-1 as measured by argon laser Raman spectroscopy) of 0.4 or less. An R value of greater than 0.4 reduces the degree of crystallinity, and thereby making the potential during lithium deintercalation higher than the potential of lithium. This reduces the battery capacity provided by the fabricated lithium-ion secondary battery, thus making it impractical.

Graphite materials used in the present invention include graphite materials that meet the property conditions as described above, such as natural graphite, artificial graphite such as kish graphite derived from easily graphitizable carbon like petroleum coke and petroleum pitch coke, and expanded graphite. It is to be noted that, although the graphite materials used in the present invention may be in the shape of a sphere, a scale, a lump, or a crushed product thereof, it is preferable that they be in the shape of a sphere, a scale, or a crushed product thereof.

Moreover, it is preferable that the particle size of graphite powder be 80 μm or less. What is referred to as the particle size here is the particle size at the peak of the particle size distribution determined by the volume-based particle size distribution measurement. Using the graphite powder having the particle size of larger than 80 μm reduces the area of contact between the graphite powder and an electrolytic solution, leading to diffusion of lithium inside the particle or reduction in the number of reaction sites, for example. This undesirably causes a problem when charge/discharge takes place at high current.

The non-graphitizing carbon is a carbon material such as glassy carbon that is hardly graphitized even when heated at high temperature. Some examples of the non-graphitizing carbon used in the present invention, although not limited thereto, are sugar, phenolic resin, polyvinylidene chloride, and carboxymethylcellulose and its derivatives: ammonium carboxymethylcellulose and lithium carboxymethylcellulose. Among them, carboxymethylcellulose and its derivative ammonium carboxymethylcellulose can be easily made into a paste, because they are soluble not only in an organic solvent but also in water, and therefore easily rubbed into a porous metal structure, making them suitable as a non-graphitizing carbon material.

It is to be noted that, in addition to the graphite powder and the non-graphitizing carbon, it is possible to mix easily graphitizable carbon that is easily graphitized when heated at high temperature. Some examples of such easily graphitizable carbon are, although not limited thereto, coke made from pitch and carbonized polyvinyl chloride. Among them, pitch can be used suitably as an easily graphitizable carbon material, because it has a chemical structure containing many benzene rings.

The fibrous powder used in the present invention is produced by crushing one of the following materials into powder: fiber of resin such as polyacrylonitrile, polyester, and polyethylene terephthalate; carbon fiber obtained by carbonizing fiber or resin based on cotton, wood, and paper, for example; fiber of metal such as iron, nickel, copper, and titanium. Among them, it is preferable to use carbon fiber obtained by carbonizing resin, because it not only contributes to the electron conductivity thereof by making contact with the particles of graphite powder inside the negative electrode, but also behaves as an electrode active material by itself. It is further preferable to use carbon fiber such as vapor-grown carbon fiber (VGCF) that exhibits a high level of graphitization.

Moreover, it is preferable that the fiber diameter of fibrous powder be between 0.1 and 80 μm. Fibrous powder having a fiber diameter of less than 0.1 μm is not preferable, because its mechanical strength is insufficient to maintain contact between the particles of graphite powder. On the other hand, fibrous powder having a fiber diameter of larger than 80 μm is not preferable, because it becomes difficult for the fibrous powder to fit into the pores of the porous metal structure.

A negative electrode is formed as follows. Negative electrode ingredients including, for example, the above-described graphite powder, non-graphitizing carbon, and fibrous powder are dissolved in an organic solvent or water, then the pores of the porous metal structure used as the charge collecting member are filled therewith, and then the porous metal structure filled therewith is sintered at high temperature. In the present invention, the graphite powder, the non-graphitizing carbon, and the fibrous powder are sintered in the pores of the porous metal structure and thus integrated together. This dramatically improves battery performance. The sintering is preferably performed at a temperature of between 600 and 1000° C., because doing so gives an interface between the porous metal structure and the carbon material used as the active material a mechanically strong structure.

In particular, with the non-graphitizing carbon attached to the surface of the graphite powder, it is possible to suppress decomposition of an electrolytic solution. In this case, however, since the electron conductivity between the particles of non-graphitizing carbon is low, the fibrous powder contributes to the electron conductivity thereof, and thereby improving the electrode performance as a whole. Moreover, the non-graphitizing carbon behaves not only as a negative electrode active material but also as a binder that binds together the negative electrode ingredients, allowing effective utilization of a portion inside the electrode occupied by the non-graphitizing carbon. This contributes to the realization of a high-capacity negative electrode.

It is to be noted that there is a possibility that, when a negative electrode is formed by sintering the negative electrode ingredients such as graphite powder, non-graphitizing carbon, and fibrous powder at high temperature, the negative electrode ingredients react with the ambient gas and thus undergo chemical reaction. Therefore, it is preferable that sintering be performed in an atmosphere of inert gas such as nitrogen or argon.

Some examples of the porous metal structure used in the present invention are a spongy metal structure, an unwoven fabric made of metal fiber, and a product obtained by sintering metal powder or forming a metal leaf into a honeycomb shape. The reason is as follows. When an electrode that is several times the thickness of an electrode for a conventional lithium-ion secondary battery is formed, it is necessary for a charge collecting member to have a three-dimensional structure in order to maintain the electron conductivity in a thickness direction.

As a material of the porous metal structure, a metal having a catalytic effect on graphitization is in particular preferable, and a metal such as group VIII transition metal including, for example, iron, cobalt, and nickel that has a catalytic activity for a carbon erosion-redeposition mechanism is further preferable. The reason is as follows. A catalytic effect gives an interface between the porous metal structure and the carbon material used as the active material a mechanically very strong structure, and whereby the porous metal structure and the active material are bonded together without being separated even after thousands of charge/discharge cycles. As the porous metal structure used in the present invention, nickel foam is in particular suitably used that is industrially available and that has not only a three-dimensional structure but also a catalytic activity.

Preferably, the porosity of the porous metal structure is 75% or more, and further preferably, 85% or more. When the porous metal structure has a porosity of less than 75%, it is not fully filled with active materials such as graphite powder, non-graphitizing carbon, and easily graphitizable carbon, leading to reduction in energy density of the battery. This makes it difficult to provide pores that can maintain a sufficient amount of electrolyte, making it impossible to achieve the desired electrode performance. Thus, the higher the porosity of the porous metal structure, the better. On the other hand, however, when the porosity is greater than 98%, the physical strength becomes insufficient to maintain the shape of the electrode and ensure thermal dissipation. Therefore, it is preferable that the porosity of the porous metal structure be 75% or more but 98% or less.

Preferably, the porous metal structure has pores, each 1 mm or less in size, and further preferably, has continuous pores, each 0.5 mm or less in size. By using a porous metal structure having such a structure, it is possible to effectively collect electric power from an active material, and furthermore it is possible to properly form a diffusion path of electrolytic ions.

When the above-described carbon electrode for a lithium-ion secondary battery is used as a negative electrode, a positive electrode is formed by mixing together powder of a transition metal oxide or a lithium transition metal oxide used as a positive electrode active material, an electrically conductive member, a binder, and, in some cases, a solid electrolyte.

Some examples of a lithium transition metal oxide used as the positive electrode active material are lithium cobaltate ($Li_xCoO_2$:0<x<2), lithium nickelate ($Li_xNiO_2$:0<x<2), a lithium nickel cobalt oxide ($Li_X(Ni_{1-y}CO_y)O_2$:0<x<2, 0<y<1), lithium manganate ($Li_xMn_2O_4$:0<x<2), and $LiFePO_4$. Among them, $LiFePO_4$ is most preferable, because it uses as a material thereof iron that is available in quantity and can be readily supplied.

The electrically conductive member is used so as to improve the electron conductivity of the positive electrode. Used as the electrically conductive member is a carbon material such as acetylene black or graphite powder, metal powder, or electrically conductive ceramic. Used as the binder is, for example, a fluoride polymer such as polytetrafluoroethylene or polyvinylidene fluoride or a polyolefin polymer such as polyethylene or polypropylene.

The mixture ratio is obtained as follows. With respect to 100 parts by weight of a lithium transition metal oxide used as the positive electrode active material, mixing therewith less than 10 parts by weight of an electrically conductive member gives a positive electrode an undesirably high resistivity over 1 Ωcm, and mixing therewith greater than 50 parts by weight of an electrically conductive member gives the positive electrode an undesirably low resistivity under 0.1 Ωcm. From a different perspective, the positive electrode is formed by rubbing the positive electrode active material, the electrically conductive member, and the binder into the charge collecting member. Thus, with respect to 100 parts by weight of a lithium transition metal oxide, mixing therewith greater than 50 parts by weight of an electrically conductive member reduces the ratio of the positive electrode active material in the positive electrode, and thus undesirably reduces the capacity. Therefore, it is preferable that the mixing ratio of the electrically conductive member be 10 parts by weight or more but 50 parts by weight or less. It is to be noted that, in the present specification, "part by weight" indicates the ratio of weight relative to the weight of the positive electrode active material expressed as a percent.

Mixing therewith less than 1 part by weight of the binder reduces the binding capacity thereof, making it impossible to form an electrode. On the other hand, mixing therewith greater than 30 parts by weight of the binder gives the positive electrode an undesirably high resistivity over 1 Ωcm, and reduces the ratio of the positive electrode active material in the positive electrode and thus undesirably reduces the capacity. Therefore, it is preferable that the mixing ratio of the binder be 1 part by weight or more but 30 parts by weight or less. During the forming processes of the positive electrode, it is preferable to perform heat treatment in each process at a temperature around the melting point of the binder so as to give a higher binding capacity.

An electrode is formed as follows. Positive electrode ingredients including, for example, the above-described positive electrode active material, electrically conductive member, and binder are dissolved in a solvent such as N-methyl-2-pyrrolidone to prepare slurry, or electrode ingredients are melted by heat, and then the pores of the charge collecting member are filled therewith. Used as the charge collecting member built as the electrode is an electrically conductive member such as a metal mesh or a metal unwoven fabric. When a plate-like metal leaf is used as the charge collecting member, the distance between the surface of the charge collecting member and the active material is undesirably large from place to place. Thus, it is preferable to use an electrically conductive member having a three-dimensional structure such as a metal unwoven fabric, metal foam, or a honeycomb shaped metal.

When such an electrode is formed, it is preferable to use a charge collecting member formed of aluminum as a positive electrode. In order to prevent the average distance between the active material and the charge collecting member from becoming too great, it is preferable that the size of each pore of the charge collecting member, which is a three-dimensional metal porous body, be 5 mm or less. When the porosity of the charge collecting member is less than 50%, the amount of active material with which the charge collecting member is filled decreases. On the other hand, when porosity thereof is 98% or more, the physical strength becomes insufficient to maintain the shape thereof. Therefore, it is preferable that the porosity of the charge collecting member be 50% or more but 98% or less.

The electrode thus formed can be thereafter compressed into a desired thickness. When the porosity of the compressed electrode is less than 40%, the volume of electrolyte in the electrode decreases, leading to an increase in the polarization ingredient in the electrolyte. This increases the magnitude of polarization of the lithium-ion secondary battery, resulting in poor load characteristics thereof. On the other hand, when the porosity is greater than 80%, the energy density of the battery undesirably decreases. Thus, it is preferable that the porosity inside the compressed electrode be 40% or more but 80% or less.

The negative electrode and the positive electrode are disposed inside the secondary battery with a separator interposed therebetween so as not to make electrical contact with each other. Used as the separator is a porous material formed of polyethylene or polypropylene. Alternatively, an unwoven fabric may be used. A material that is not dissolved or swollen in an organic solvent contained in the electrolyte is suitable as a material of the separator. For example, it is preferable to use a polyester polymer, a polyolefin polymer, an ether polymer, or an inorganic material such as glass.

When a battery is formed by using a carbon electrode for a lithium-ion secondary battery of the present invention, an organic electrolytic solution, a solid polyelectrolyte, an inorganic solid electrolyte, or molten salt, for example, can be used as an ion conductor. Among them, an organic electrolytic solution is suitably used. Some examples of a solvent of the organic electrolytic solution are, for example, ester such as propylene carbonate, ethylene carbonate (hereinafter referred to as EC), butylene carbonate, diethyl carbonate, dimethyl carbonate, methylethyl carbonate, and γ-butyrolactone (hereinafter referred to as GBL), ether such as substituted tetrahydrofuran such as tetrahydrofuran or 2-methyltetrahydrofuran, dioxolane, diethyl ether, dimethoxyethane, diethoxyethane, or methoxyethoxyethane, dimethyl sulfoxide, sulfolane, methylsulfolane, acetonitrile, methyl formate, and methyl acetate. Of these solvents, one is used singly or two or more are used as a mixed solvent.

An electrolytic salt dissoluble in an organic solvent includes a lithium salt such as lithium perchlorate, lithium borofluoride, lithium hexafluorophosphate (hereinafter referred to as $LiPF_6$), lithium hexafluoroarsenate, lithium trifluoromethanesulfonate, lithium halide, or lithium aluminate. Of these lithium salts, one is used singly or two or more are used together. When the concentration of electrolytic salt is less than 0.5 mol/L, the concentration of carriers carrying an electrical charge in the electrolyte decreases, giving the electrolyte an undesirably high resistance. On the other hand, when the concentration of electrolytic salt becomes greater than 2.5 mol/L, the degree of dissociation of salt itself decreases, suppressing an increase in the concentration of carriers in the electrolyte. Thus, it is preferable that the concentration of electrolytic salt in the present embodiment be 0.5 mol/L or more but 2.5 mol/L or less, and further preferably, 1.0 mol/L or more but 2.2 mol/L or less.

A solid electrolyte may be used as the electrolyte. This solid electrolyte can be formed by mixing a monomer, for example, with the above-described organic solvent and solidifying the mixture thus obtained by a cross-linking reaction or a polymerization reaction. At this time, as a monomer to be mixed therewith, ethylene oxide or propylene oxide, for example, may be used. Of these monomers, one may be used singly or two or more may be used in combination. Using a too small amount of monomer relative to the organic solvent makes it difficult to solidify a mixture thereof, and using a too large amount thereof inhibits the conductivity of the lithium ion. Thus, it is preferable that the volume fraction of monomer be 1% or more but 50% or less.

When such a solid electrolyte is formed, it is possible to add an initiator for facilitating a cross-linking reaction or a polymerization reaction between the organic solvent and the monomer. As the initiator, azoisobutyronitrile or benzoyl peroxide may be used. Of these initiators, one may be used singly or two or more may be used in combination.

Such a solid electrolyte can also be formed as follows. One or two or more of polymers such as polyvinylidene fluoride, hexafluoropropylene, polymethyl methacrylate, and a polyvinyl chloride are mixed together. Then, the mixture thus obtained is dissolved in a solvent such as tetrahydrofuran or N-methyl-2-pyrrolidone and is then cast. The casting thus produced is then dried, for example, for removing the solvent therefrom, and then the resulting product is impregnated with the above-described organic solvent. Alternatively, this solid electrolyte can be formed by mixing polyacrylonitrile, methyl acrylate, or vinyl acetate with the above-described organic solvent, and then applying heat to the mixture thus obtained for solidifying it by polymerizing.

If the above-described electrolyte contains moisture, a side reaction occurs such as decomposition of water when the battery charges/discharges, causing problems such as reduction in the efficiency of the battery itself, deterioration of cycle characteristics, or the occurrence of gas inside the battery. This makes it necessary to reduce the amount of moisture of the solvent of the electrolyte as much as possible. Thus, water may be removed from the solvent of the electrolyte by using a molecular sieve, an alkali metal, alkaline-earth metals, alkali metal hydride such as calcium hydride, or activated aluminum. The concentration (weight concentration) of moisture contained in this solvent is 1000 ppm or less, and further preferably, 100 ppm or less. Note that 1 ppm is equivalent to 0.0001%.

FIG. 1 shows a schematic diagram of the lithium-ion secondary battery of the present invention. A lithium-ion secondary battery 1 is manufactured as follows. A positive electrode 2 and a negative electrode 3 formed by the above-described method are stacked with a separator 4 interposed therebetween and then inserted into a covering material (a battery vessel) 5. Then, the product thus obtained is impregnated with an electrolyte, and then the vessel is sealed. The positive electrode 2 and the negative electrode 3 are connected to a terminal (a lead wire) 6, and the other end of the terminal 6 extends from the covering material 5. Preferably, moisture is removed from the positive electrode 2 and the negative electrode 3 before they are impregnated with the electrolyte. Moisture can be removed therefrom by a method such as heat application or drying under reduced pressure. In practice, however, moisture may be removed therefrom by any other moisture removing method. The covering material 5 can be formed of metal or aluminum-laminated resin, though not limited thereto.

Figure 2:
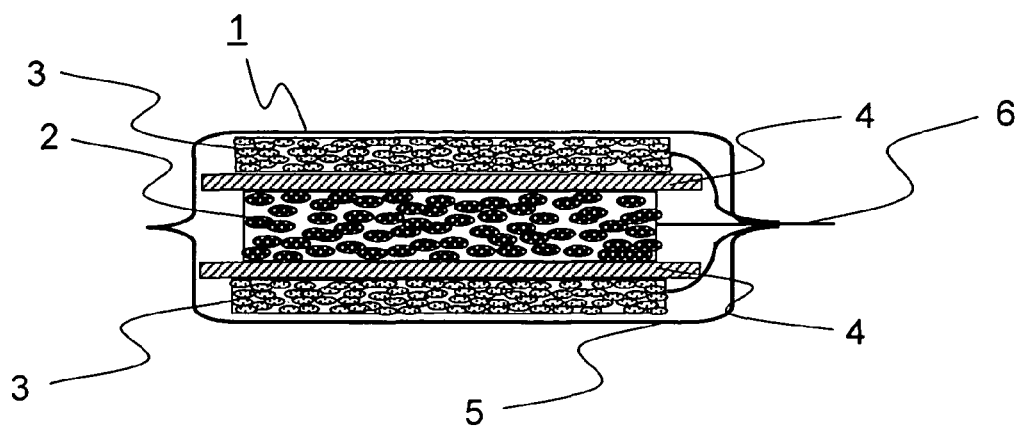
FIG. 2 is a schematic sectional view of the lithium-ion secondary battery of the present invention provided with one positive electrode and two negative electrodes.

As shown in FIG. 2, the lithium-ion secondary battery structured as described above may be modified in such a way that two negative electrodes 3 are disposed on both faces of one positive electrode 2 with the separators 4 interposed therebetween. Alternatively, as shown in FIG. 3, it may be modified in such a way that two positive electrodes 2 are disposed on both faces of one negative electrode 3 with the separators 4 interposed therebetween.

When the lithium-ion secondary battery is formed with one positive electrode and two negative electrodes as shown in FIG. 2, for it to operate as a battery, it is necessary to make the capacity per unit area of the negative electrode equal to half of the capacity per unit area of the positive electrode. In that case, the capacity per unit electrode area of the positive electrode is preferably 10 mAh/cm$^2$ or more but 50 mAh/cm$^2$ or less, and the capacity per unit electrode area of the negative electrode is preferably 5 mAh/cm$^2$ or more but 25 mAh/cm$^2$ or less.

Figure 3:
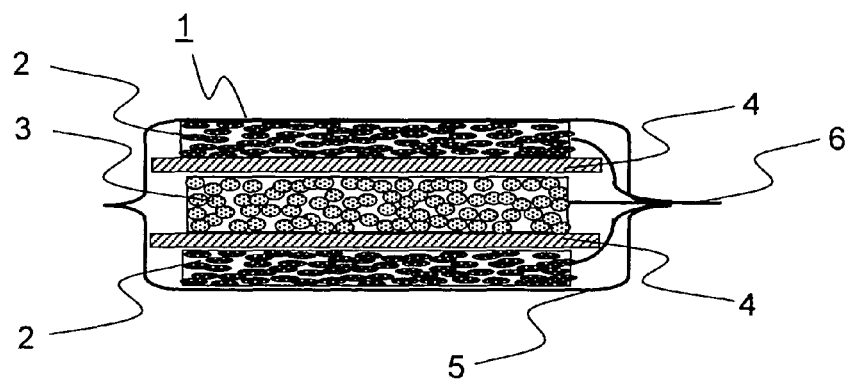
FIG. 3 is a schematic sectional view of the lithium-ion secondary battery of the present invention provided with two positive electrodes and one negative electrode.

When the lithium-ion secondary battery is formed with two positive electrodes and one negative electrode as shown in FIG. 3, for it to operate as a battery, it is necessary to make the capacity per unit area of the positive electrode equal to half of the capacity per unit area of the negative electrode. In that case, the capacity per unit area of the negative electrode is preferably 10 mAh/cm$^2$ or more but 50 mAh/cm$^2$ or less, and the capacity per unit area of the positive electrode is preferably 5 mAh/cm$^2$ or more but 25 mAh/cm$^2$ or less.

How to make the positive or negative electrode of the lithium-ion secondary battery to be formed have the electrical capacity per unit area of 10 mAh or more but 50 mAh or less or 5 mAh or more but 25 mAh or less will be specifically described below. The capacity per unit weight of active material used in a battery is generally expressed in "mAh/g", which indicates how much capacity one gram of active material has. Specifically, for example, when a positive electrode having the electrical capacity per unit area of 10 mAh or more is formed, the weight of the required active material can be calculated by dividing 10 mAh by the mAh/g value of the active material.

Here, the capacity per unit weight of active material needs to be, not a theoretical capacity derived from calculation, the capacity it offers when actually driven in the battery. For example, when LiCoO$_2$ is used as a positive electrode active material, a design value of the capacity thereof, although a theoretical capacity thereof is calculated to be 275 mAh/g, is approximately 140 m Ah/g. In this case, the weight of the active material required for an electrode having the electrical capacity per unit area of 10 mAh or more is found to be approximately 71 mg when calculated in such a manner as described above.

Despite having a larger number of electrodes than the lithium-ion secondary battery formed with one positive electrode and one negative electrode (see FIG. 1), the lithium-ion secondary battery structured as described above offers slightly improved load characteristics, because one of the positive and negative electrode is made thinner. In particular, when the capacity per unit area of the negative electrode is equal to half of the capacity per unit area of the positive electrode when operating as a lithium-ion secondary battery, that is, when two negative electrodes are disposed on both faces of one positive electrode (see FIG. 2), the resistance component on a negative electrode side decreases. This suppresses deposition of metallic lithium at the time of charging.

When the lithium-ion secondary battery is formed by stacking the electrodes in such a manner as described above, the total number of electrodes to be stacked is preferably three or less, that is, it is preferable to use two negative electrodes with respect to one positive electrode or two positive electrodes with respect to one negative electrode. When the number of electrodes to be stacked is larger than three, there is a possibility of requiring welding for establishing electrical connection between the charge collecting members, or requiring positioning, for example, due to the increased number of electrodes to be stacked This reduces the manufacturing efficiency. On the other hand, the number of separators to be disposed between the positive electrode and the negative electrode also increases, affecting the speed of thermal dissipation. This undesirably deteriorates the thermal dissipation characteristics.

In such a lithium-ion secondary battery, it is preferable that the capacity ratio of a negative electrode to a positive electrode be 1 or more but 1.5 or less. It is to be noted that, in the present specification, the "capacity ratio" is defined as the ratio of the total capacity (design value) of a negative electrode inside the battery to the total capacity (design value) of a positive electrode inside the battery when a lithium-ion secondary battery does not operate as a battery. When the capacity ratio is less than 1, the design capacity value of a positive electrode becomes greater than that of a negative electrode, increasing the number of lithium ions included in the positive electrode. As a result, the number of lithium ions moving from the positive electrode to the negative electrode at the time of charging is too large to let them in the negative electrode, and part of the lithium ions may deposit on the negative electrode as metallic lithium. The lithium deposited as metallic lithium does not contribute to a charge/discharge reaction, undesirably leading to reduction of the battery capacity.

On the other hand, when the capacity ratio is greater than 1.5, the design capacity value of the negative electrode becomes greater than that of the positive electrode. This reduces the volume proportion of the negative electrode to be used when operating as a battery. As a result, although there is no possibility that the number of the lithium ions moving from the positive electrode to the negative electrode at the time of charging is too large to let them in the negative electrode, and thus that part thereof deposits as metallic lithium, the proportion of portion of the negative electrode that does not contribute to a charge/discharge reaction undesirably increases.

A manufacturing method of a lithium-ion secondary battery and a carbon electrode used in the lithium-ion secondary battery of the present invention, and test and evaluation results thereof will be described below. Incidentally, any conventionally known method such as a method disclosed in JP-A-S61-111907 or "Tanso Zairyo Jikken Gijutsu (Carbon Material Experimental Technique) 1", edited by the Carbon Society of Japan (published by Kagaku Gijutsu Sha), pp. 55-63, can be used for measuring the size (Lc, La) of the crystallite based on wide-angle X-ray diffractometry. The form factor K used for the determination of the crystallite size was 0.9. The particle size was measured by using a laser diffraction particle size analyzer. What is referred to as the particle size here is the particle size at the peak of the particle size distribution.

Example 1

In Example 1, 20 grams of natural graphite powder from China (scaly particles having a size of 11 µm, d002 of 0.336 nm, Lc of 100 nm, La of 100 nm, an R value of 0, and a specific surface area of 8 m$^2$/g), 1 gram of coal pitch (flaky particles having a size 15 µm), 1 gram of carboxymethylcellulose, and 5 grams of VGCF (fibrous powder having a particle size of 5 µm) were mixed in a mortar, and then 40 mL of ion exchange water was added thereto so as to obtain a paste. The paste thus obtained was rubbed into a nickel foam plate (30×30 mm in area, 1 mm in thickness, a porosity of 90%, and a maximum pore diameter of 0.5 mm). The resulting plate was then temporarily dried in an atmosphere with a temperature of 60° C., and was then sintered in a nitrogen atmosphere at 1000° C. for 5 hours, and then a nickel lead wire was spot-welded thereto so as to obtain a carbon electrode for a lithium-ion secondary battery. Suppose that the charge/discharge capacity per unit weight of carbon is 300 mAh/g. Then, the charge/discharge capacity of the electrode thus obtained was 220 mAh.

Example 2

In Example 2, 20 grams of artificial graphite powder (flaky particles having a size of 18 µm, d002 of 0.337 nm, Lc of 80 nm, La of 80 nm, an R value of 0, and a specific surface area of 12 m$^2$/g), 1 gram of petroleum pitch (flaky particles having a size of 12 µm), 1 gram of carboxymethylcellulose, and 5 grams of copper fiber (fibrous powder having a particle size of 5 µm) were mixed in a mortar, and then 40 mL of ion exchange water was added thereto so as to obtain a paste. The paste thus obtained was rubbed into a SUS304 plate with a lath structure (30×30 mm in area, 1 mm in thickness, a porosity of 90%, and a maximum pore diameter of 0.5 mm). The resulting plate was then temporarily dried in an atmosphere with a temperature of 60° C., and was then sintered in a nitrogen atmosphere at 600° C. for 5 hours, and then a nickel lead wire was spot-welded thereto so as to obtain a carbon electrode for a lithium-ion secondary battery. Suppose that the charge/discharge capacity per unit weight of carbon is 300 mAh/g. Then, the charge/discharge capacity of the electrode thus obtained was 200 mAh.

Example 3

In Example 3, 20 grams of natural graphite powder from Madagascar (scaly particles having a size of 12 µm, d002 of 0.336 nm, Lc of 100 nm, La of 100 nm, an R value of 0, and a specific surface area of 7 m$^2$/g), 1 gram of coal pitch (flaky particles having a size of 15 μm), 1 gram of carboxymethylcellulose, and 5 grams of polyester fiber (fibrous powder having a particle size of 8 μm) were mixed in a mortar, and then 40 mL of ion exchange water was added thereto so as to obtain a paste. The paste thus obtained was rubbed into a nickel foam plate (30×30 mm in area, 1 mm in thickness, a porosity of 90%, and a maximum pore diameter of 0.5 mm). The resulting plate was then temporarily dried in an atmosphere with a temperature of 60° C., and was then sintered in a nitrogen atmosphere at 1000° C. for 5 hours, and then a nickel lead wire was spot-welded thereto so as to obtain a carbon electrode for a lithium-ion secondary battery. Suppose that the charge/discharge capacity per unit weight of carbon is 300 mAh/g. Then, the charge/discharge capacity of the electrode thus obtained was 215 mAh.

Comparative Example 1

In Comparative Example 1, 25 grams of natural graphite powder from China (scaly particles having a size of 11 μm, d002 of 0.336 nm, Lc of 100 nm, La of 100 nm, an R value of 0, and a specific surface area of 8 m$^2$/g), 1 gram of coal pitch (flaky particles having a size of 15 μm), and 1 gram of carboxymethylcellulose were mixed in a mortar, and then 40 mL of ion exchange water was added thereto so as to obtain a paste. The paste thus obtained was rubbed into a nickel foam plate (30×30 mm in area, 1 mm in thickness, a porosity of 90%, and a maximum pore diameter of 0.5 mm). The resulting plate was then temporarily dried in an atmosphere with a temperature of 60° C., and was then sintered in a nitrogen atmosphere at 1000° C. for 5 hours, and then a nickel lead wire was spot-welded thereto so as to obtain a carbon electrode for a lithium-ion secondary battery. Suppose that the charge/discharge capacity per unit weight of carbon is 300 mAh/g. Then, the charge/discharge capacity of the electrode thus obtained was 210 mAh.

Comparative Example 2

In Comparative Example 2, 20 grams of natural graphite powder from China (scaly particles having a size of 11 μm, d002 of 0.336 nm, Lc of 100 nm, La of 100 nm, an R value of 0, and a specific surface area of 8 m$^2$/g), 1 gram of coal pitch (flaky particles having a size of 15 μm), 1 gram of carboxymethylcellulose, and 5 grams of VGCF (fibrous powder having a particle size of 5 μm) were mixed in a mortar, and then 40 mL of ion exchange water was added thereto so as to obtain a paste. The paste thus obtained was applied to a copper plate (30×30 mm in area and 0.05 mm in thickness) with a thickness of 0.2 mm. The resulting plate was then temporarily dried in an atmosphere with a temperature of 60° C., and was then sintered in a nitrogen atmosphere at 1000° C. for 5 hours. However, an electrode was unsuccessfully obtained, because it become cracked and thus part thereof come off the copper plate.

Figure 4:
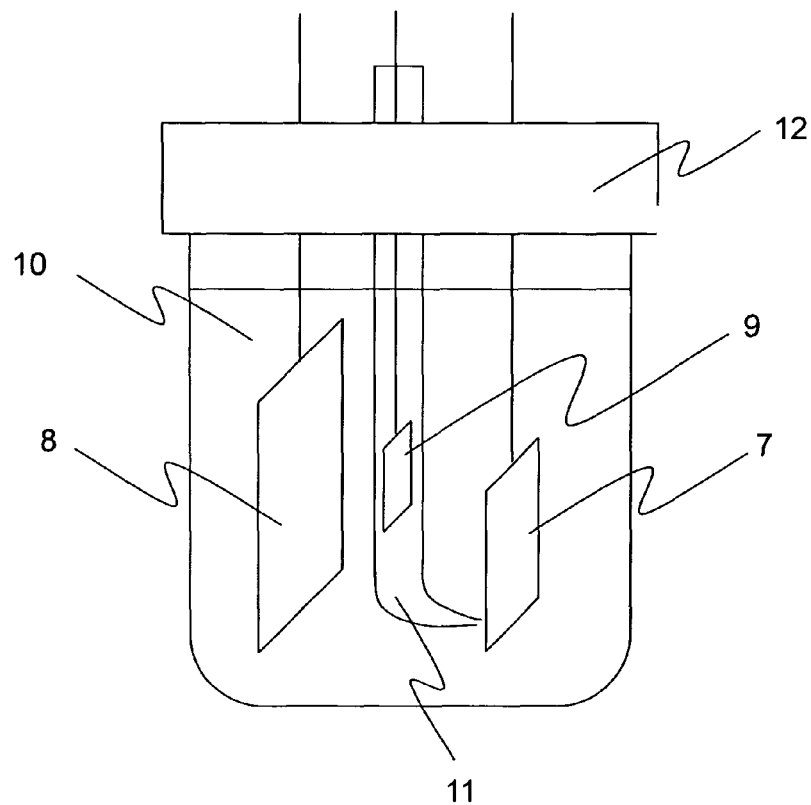
FIG. 4 is a schematic diagram of the cell used for testing the electrode to be used in the lithium-ion secondary battery of the present invention.

A three-electrode cell as shown in FIG. 4 was formed by using each of the electrodes of Examples 1 to 3 and Comparative Example 1 as a test electrode 7, a plate of lithium as a counter electrode 8, and a piece of lithium as a reference electrode 9. Used as an electrolytic solution was LiPF$_6$ dissolved in a mixed solvent of EC+GBL (volume ratio 1:1) at a salt concentration of 1 mol/l (hereinafter referred to as 1M-LiPF$_6$/EC+GBL (1:1 vol)). The cell thus obtained was charged at a constant current of 0.1 C (the current value at which the electrode can be discharged of its charge/discharge capacity in ten hours) up to 0V vs Li/Li$^+$, and was then charged at a constant potential of 0V vs Li/Li$^+$ for two hours. Then, the discharge capacity of the resulting cell discharged up to 2.5V vs Li/Li$^+$ at constant currents of 0.1 C, 0.5 C, and 1 C (0.5 C is the current value at which the electrode can be discharged of its charge/discharge capacity in two hours; 1 C is the current value at which the electrode can be discharged of its charge/discharge capacity in one hour) was measured. The results thus obtained were shown in FIG. 5.

Figure 6:
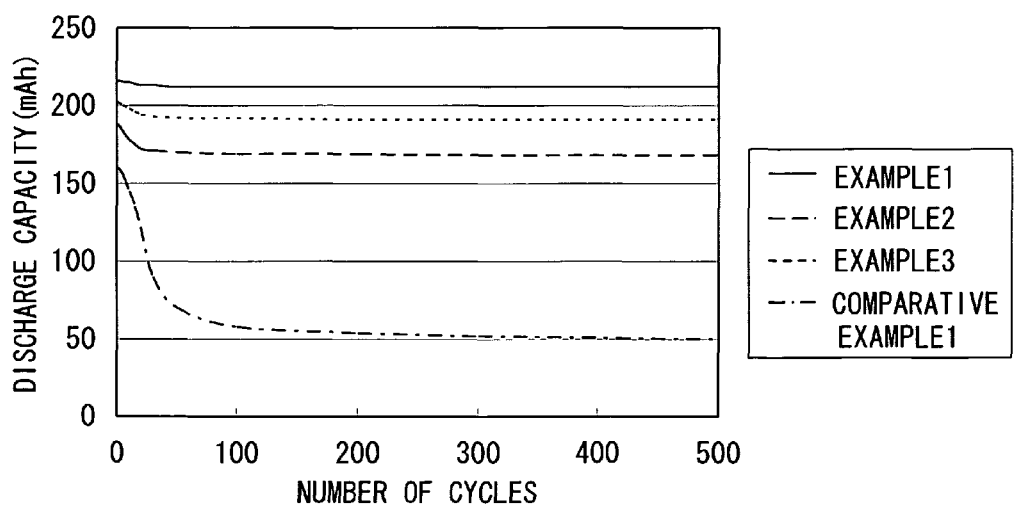
FIG. 6 is a graph showing the charge/discharge cycle performance of the electrode to be used in the lithium-ion secondary battery of the present invention.

The same cell was charged at a constant current of 0.5 C up to 0V vs Li/Li$^+$, and was then charged at a constant potential of 0V vs Li/Li$^+$ for 30 minutes. Then, the discharge capacity of the resulting cell discharged at a constant current of 0.5 C up to 2.5V vs Li/Li$^+$ was measured. FIG. 6 shows variations in the discharge capacity thereof when the above-described charge/discharge cycles were repeated 500 times.

Figure 5:
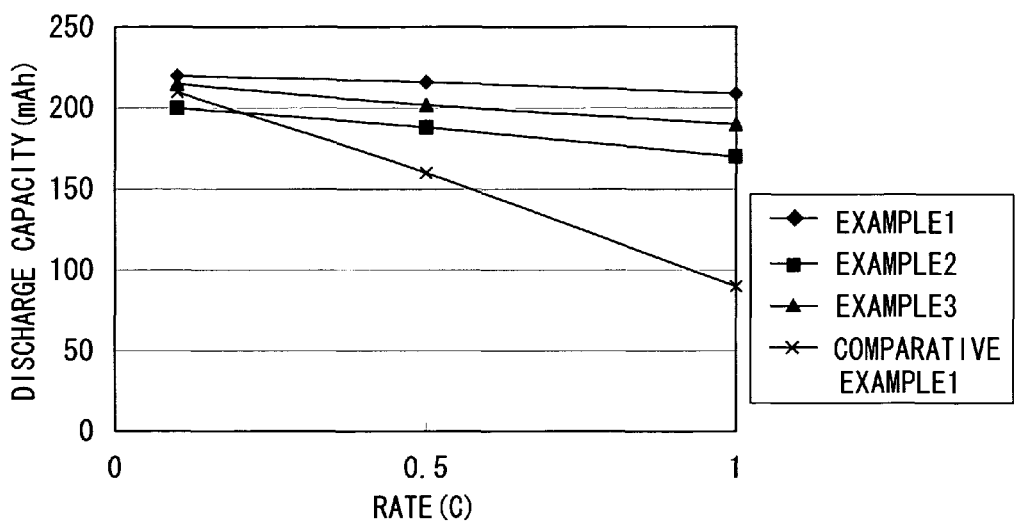
FIG. 5 is a graph showing the discharge performance of the electrode to be used in the lithium-ion secondary battery of the present invention.

As shown in FIG. 5, it was found that the electrode of Comparative Example 1 containing no fibrous powder exhibited a considerably lower discharge performance at a high current value than the electrode of Example 1 containing fibrous powder. Moreover, a comparison between the results of Examples 1, 2, and 3 showed that, among different types of fibrous powder, powder of highly graphitized carbon fiber had a good discharge performance. This made it clear that the fibrous powder not only increased the mechanical strength of the electrode but also contributed to the electron conductivity thereof.

As shown in FIG. 6, it was found that, whereas the electrode of Comparative Example 1 containing no fibrous powder suffered from a considerable reduction in the discharge capacity when charge/discharge cycles were repeated no more than 100 times, the electrode of Example 1 containing fibrous carbon suffered from almost no reduction in the discharge capacity even after 500 charge/discharge cycles. This is attributed to the fibrous powder preventing the electrode from coming apart due to the repeated change in volume of the electrode caused by the repeated charge/discharge cycles. Moreover, a comparison between the results of Examples 1, 2, and 3 showed that, among different types of fibrous powder, powder of highly graphitized carbon fiber had a good charge/discharge cycle performance. Incidentally, the result of Comparative Example 2 showed that, when a porous metal structure was not used as a charge collecting member, the electrode could not maintain its strength when sintered at high temperature.

Example 4

The lithium-ion secondary battery of Example 4 was formed according to the following procedure.
(Preparation of a Negative Electrode)

In preparation of a negative electrode, 20 grams of natural graphite powder from China (scaly particles having a size of 11 μm, d002 of 0.336 nm, Lc of 100 nm, La of 100 nm, an R value of 0, and a specific surface area of 8 m$^2$/g), 1 gram of coal pitch (flaky particles having a size 15 μm), 1 gram of carboxymethylcellulose, and 5 grams of VGCF (fibrous powder having a particle size of 5 μm) were mixed in a mortar, and then 40 mL of ion exchange water was added thereto so as to obtain a paste. The paste thus obtained was rubbed into a nickel foam plate (32×32 mm in area, 1 mm in thickness, a porosity of 90%, and a maximum pore diameter of 0.5 mm). The resulting plate was then temporarily dried in an atmosphere with a temperature of 60° C., and was then sintered in a nitrogen atmosphere at 1000° C. for 5 hours, and then a nickel lead wire was spot-welded thereto so as to obtain a carbon electrode for a lithium-ion secondary battery. Suppose that the charge/discharge capacity per unit weight of carbon is 300 mAh/g. Then, the charge/discharge capacity of the electrode thus obtained was 220 mAh.

(Preparation of a Positive Electrode)

First, LiFePO$_4$ used here as a positive electrode active material, acetylene black used as electrically conductive member, and polyvinylidene fluoride used as the binder were mixed together. Here, 10 parts by weight of electrically conductive member of the positive electrode (hereinafter referred to as a positive electrode electrically conductive member) and 4 parts by weight of binder of the positive electrode were used. The mixture thus obtained by mixing the above-described positive electrode active material, positive electrode electrically conductive member, and the binder was dissolved in a solvent of N-methyl-2-pyrrolidone so as to prepare slurry. The slurry thus prepared was injected into a positive electrode charge collecting member of aluminum foam. Then, the product thus obtained was dried at 60° C. for removing the solvent therefrom, and was then pressed at a pressure of 1000 kg/cm$^2$ to a thickness of 3 mm. One sheet of the positive electrode thus formed was cut to a size of 30 mm×30 mm. Then, an aluminum lead wire was ultrasonic welded thereto so as to obtain a positive electrode for a lithium-ion secondary battery. Suppose that the charge/discharge capacity per unit weight of positive electrode active material is 120 mAh/g. Then, the charge/discharge capacity of the electrode thus obtained was 200 mAh.

(Assembly of a Battery)

One positive electrode and one negative electrode thus obtained were stacked with a separator formed of porous polyethylene interposed therebetween so as not to make electrical contact with each other. Then, the product thus obtained was inserted into a bag-shaped covering material (battery vessel) formed with two rectangular sheets of aluminum-laminated resin sealed together on three sides. In that case, the one side of the aluminum-laminated resin remained without being sealed served as an opening. Then, the covering material formed of aluminum-laminated resin with the positive electrode, the negative electrode, and the separator housed therein was inserted to a decompression chamber, and was then dried under reduced pressure at 100° C. for 12 hours. After drying, an electrolytic solution was injected in sufficient quantity to impregnate the electrodes therewith, and then the opening of the covering material was sealed. In this way, the lithium-ion secondary battery of Example 4 was formed. Incidentally, used as the electrolytic solution was 1M-LiPF$_6$/EC+GBL (2:3 vol). The lithium-ion secondary battery formed in such a manner as described above was tested as follows.

(Test of the Battery)

Figure 7:
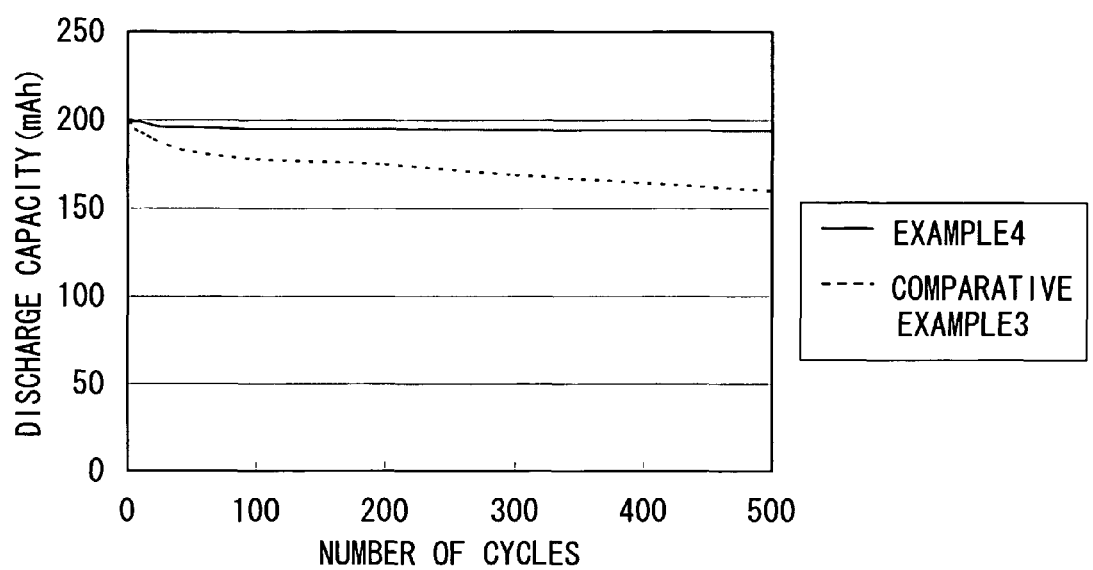
FIG. 7 is a graph showing the charge/discharge cycle performance of the lithium-ion secondary battery of the present invention.

The test was conducted as follows. The battery was charged at a constant current of 50 mA until battery voltage reached 3.9 V, and was then charged at a constant voltage of 3.9 V for three hours. Then, the electrical capacity of the battery, after discharged at a constant current of 50 mA until battery voltage dropped to 2.3 V, was measured. FIG. 7 shows variations in the capacity when the above-described charge/discharge cycles were repeated 500 times.

(Measurement of the Porosity and Resistivity of the Electrode)

The porosities of the positive and negative electrodes formed in such a manner as described above were 40%, and the resistivities thereof were 1 Ωcm and 0.5 Ωcm, respectively. Here, the porosity of each of the positive and negative electrodes was calculated based on volume of the electrode and the theoretical density of each member. The resistivity was determined as follows. The paste of the above-described positive or negative electrode was, not injected into the charge collecting member, cast and then dried so as to have the dimensions of 1 cm×1 cm×0.5 cm, and then the resistivity thereof was measured by using a direct-current four terminal method.

Comparative Example 3

The lithium-ion secondary battery of Comparative Example 3 was formed according to the following procedure.

(Preparation of a Negative Electrode)

In preparation of the negative electrode, 20 grams of natural graphite powder from China (scaly particles having a size of 11 μm, d002 of 0.336 nm, Lc of 100 nm, La of 100 nm, an R value of 0, and a specific surface area of 8 m$^2$/g), 1 gram of coal pitch (flaky particles having a size 15 μm), 1 gram of carboxymethylcellulose, and 5 grams of VGCF (fibrous powder having a particle size of 5 μm) were mixed in a mortar, and then 40 mL of ion exchange water was added thereto so as to obtain a paste. The paste thus obtained was rubbed into a nickel foam plate (32×32 mm in area, 1 mm in thickness, a porosity of 90%, and a maximum pore diameter of 0.5 mm). The resulting plate was then temporarily dried in an atmosphere with a temperature of 60° C., and was then fully dried under reduced pressure at 150° C. for 12 hours, and then a nickel lead wire was spot-welded thereto so as to obtain a carbon electrode for a lithium-ion secondary battery. Suppose that the charge/discharge capacity per unit weight of carbon is 300 mAh/g. Then, the charge/discharge capacity of the electrode thus obtained was 220 mAh.

Preparation of a positive electrode, assembly of a battery, and the measurement of the porosity and resistivity of the electrode were performed in the same manner as described in Example 4, and the test of the battery was too conducted under the same conditions as described in Example 4 by repeating charge/discharge cycles. FIG. 7 shows the results obtained when charge/discharge cycles were repeated 500 times. Incidentally, the porosity and resistivity of the positive electrode were identical to those of Example 4, and the porosity and resistivity of the negative electrode were 48% and 1.1 Ωcm, respectively.

As shown in FIG. 7, it was found that, whereas the battery of Comparative Example 3 using a non-sintered negative electrode suffered from a considerable reduction in the discharge capacity when charge/discharge cycles were repeated 500 times, the battery of Example 4 using a negative electrode sintered at 1000° C. suffered from almost no reduction in the discharge capacity even after 500 charge/discharge cycles. The reason is considered to be as follows. When the negative electrode is formed without being sintered, the negative electrode charge collecting member and the negative electrode active material are just physically attached to each other at an interface therebetween. In that case, the negative electrode active material comes off the charge collecting member due to the repeated change in volume of the negative electrode caused by the repeated charge/discharge cycles. In view of this, sintering was found to give an interface between the negative electrode charge collecting member and the negative electrode active material a mechanically strong structure, considerably contributing to the charge/discharge cycle performance of the battery.

Though not shown in the drawing, when the lithium-ion secondary battery was assembled by using each of the negative electrodes of Examples 1 to 3 based on the method described in Example 4 and then the charge/discharge cycle performance thereof was evaluated in the same manner, the lithium-ion secondary battery thus assembled offered as good charge/discharge cycle performance as that of Example 4 with no reduction in the discharge capacity.

Moreover, as in the case of the lithium-ion secondary battery having the structure in which one positive electrode and one negative electrode are disposed, it was confirmed that the lithium-ion secondary battery having the structure, as shown in FIG. 2 or 3, in which two negative electrodes are disposed on both faces of one positive electrode or two positive electrodes are disposed on both faces of one negative electrode offered good charge/discharge cycle performance with no reduction in the discharge capacity.

The present invention is a lithium-ion secondary battery having a battery capacity of 5 Ah or more, the lithium-ion secondary battery provided with: a positive electrode formed with a positive electrode active material, an electrically conductive member, a binder, and a charge collecting member; a negative electrode formed with a negative electrode active material, an electrically conductive member, a binder, and a charge collecting member; and an electrolyte containing an electrolytic salt. The electrical resistivity of the mixture of a positive electrode active material, an electrically conductive member, and a binder is 0.1 Ωcm or more but 1 Ωcm or less. The positive and negative electrodes each have an electrical capacity of 10 mAh or more but 50 mAh or less per volume of a rectangular parallelepiped that has a 1 cm$^2$ square base on a face of the electrode of one polarity facing the electrode of the other polarity and that has a height equal to the thickness of the electrode of the one polarity at the square base. The negative electrode thereof is formed by sintering negative electrode ingredients including graphite powder, non-graphitizing carbon, and fibrous powder in pores of a porous metal structure used as the charge collecting member.

This makes it possible to provide a lithium-ion secondary battery having a battery capacity of 5 Ah or more that is compact in size, easy to manufacture, and has a good high-current discharge performance, that suffers less from reduction in the discharge capacity even when charge/discharge cycles are repeated over an extended period of time, and that is suitable for energy storage purposes or for use as an electric power source for an electric automobile.

The porous metal structure is made to have a porosity of 75% or more but 98% or less. This increases energy density and makes it possible to maintain the shape of the electrode and ensure thermal dissipation. Furthermore, by using iron, cobalt, nickel, or an alloy thereof as a material of the porous metal structure, a catalytic effect on graphitization gives an interface between the porous metal structure and the carbon material used as the active material a mechanically very strong structure. This permits the porous metal structure and the active material to be bonded together without being separated even when charge/discharge cycles are repeated over an extended period of time.

A carboxymethylcellulose polymer or a carboxymethylcellulose derivative that is soluble not only in an organic solvent but also in water is used as non-graphitizing carbon. This makes it easy to make the negative electrode material into a paste and rub the paste thus obtained into the porous metal structure. This helps simplify the manufacturing procedure of the lithium-ion secondary battery and reduce the manufacturing cost thereof.

Powder of highly graphitized carbon fiber is used as the fibrous powder. This helps achieve a high-capacity lithium-ion secondary battery, because carbon fiber not only contributes to the electron conductivity of the negative electrode but also behaves as an electrode active material by itself. In addition to this, by using the fibrous powder having a fiber diameter of between 0.1 and 80 μm, it is possible to give the fibrous powder a mechanical strength sufficient to maintain contact between particles of graphite powder and to make it easy for the fibrous powder to fit into the pores of the porous metal structure.

By using the graphite powder having an interlayer spacing (d002) of between 0.335 and 0.340 nm, a crystallite thickness in (002) plane direction of 10 nm or more, and a crystallite thickness in (110) plane direction of 10 nm or more, the potential during lithium deintercalation becomes closer to the potential of lithium. This makes it possible to achieve a high-capacity carbon electrode, helping achieve a high-capacity lithium-ion secondary battery.

Since the negative electrode is sintered at a temperature of between 600 and 1000° C., the graphite powder, the non-graphitizing carbon, and the fibrous powder are sintered and thus integrated together in the pores of the porous metal structure, giving an interface thereof a strong mechanical structure. This helps realize a lithium-ion secondary battery that offers dramatically improved charge/discharge cycle performance.

The negative electrode is formed by mixing together the negative electrode ingredients including the graphite powder, the non-graphitizing carbon, and the fibrous powder, adding a solvent thereto so as to obtain a paste, rubbing the paste thus obtained into the pores of the porous metal structure, and then sintering the product thus obtained at a temperature of between 600 and 1000° C. The positive electrode is formed by dissolving the mixture of the positive electrode ingredients including the positive electrode active material, the electrically conductive member, and the binder in an solvent so as to prepare slurry, injecting the slurry thus prepared into the charge collecting member, and drying the product thus obtained. The negative and positive electrodes thus formed are stacked with a separator interposed therebetween so as not to make electrical contact with each other, and then inserted into a covering material. The covering material is sealed after an electrolytic solution is injected thereinto. This makes it possible to provide a method of manufacturing at low cost and with a simple procedure a lithium-ion secondary battery that has a good high-current discharge performance and suffers less from reduction in the discharge capacity even when charge/discharge cycles are repeated over an extended period of time.

What is claimed is:

1. A lithium-ion secondary battery having a battery capacity of 5 Ah or more, the lithium-ion secondary battery comprising:
    a positive electrode comprising a positive electrode active material, a first electrically conductive member, a first binder, and a first charge collecting member;
    a negative electrode comprising a negative electrode active material, a second electrically conductive member, a second binder, and a second charge collecting member; and
    an electrolyte containing an electrolytic salt,
    wherein
    an electrical resistivity of a mixture of the positive electrode active material, the first electrically conductive member, and the first binder is 0.1 Ωcm or more but 1 Ωcm or less,
    the positive and negative electrodes each have an electrical capacity of 10 mAh or more but 50 mAh or less per volume of a rectangular parallelepiped that has a 1 cm$^2$ square base on a face of the electrode of one polarity facing the electrode of the other polarity and that has a height equal to a thickness of the electrode of the one polarity at the square base, a capacity ratio of the negative electrode to the positive electrode is 1 or more but 1.5 or less, and the negative electrode is formed by sintering negative electrode ingredients including graphite powder, non-graphitizing carbon, and fibrous powder in pores of a porous metal structure used as the second charge collecting member.

2. The lithium-ion secondary battery of claim 1,
wherein a porosity of the porous metal structure is 75% or more but 98% or less.

3. The lithium-ion secondary battery of claim 1,
wherein the porous metal structure is formed of a material selected from the group consisting of iron, cobalt, nickel, and an alloy thereof.

4. The lithium-ion secondary battery of claim 3,
wherein the porous metal structure is nickel foam.

5. The lithium-ion secondary battery of claim 1,
wherein the non-graphitizing carbon is a carboxymethylcellulose polymer or a polymer of carboxymethylcellulose derivative.

6. The lithium-ion secondary battery of claim 1,
wherein the fibrous powder is powder of highly graphitized carbon fiber.

7. The lithium-ion secondary battery of claim 1,
wherein a fiber diameter of the fibrous powder is between 0.1 and 80 μm.

8. The lithium-ion secondary battery of claim 1,
wherein the graphite powder exhibits, when subjected to wide-angle X-ray diffractometry, an average interplanar spacing of (002) plane of between 0.335 and 0.340 nm, a crystallite thickness in (002) plane direction of 10 nm or more, and a crystallite thickness in (110) plane direction of 10 nm or more.

9. The lithium-ion secondary battery of claim 1,
wherein a particle size of the graphite powder is not more than 80 μm.

10. The lithium-ion secondary battery of claim 1,
wherein a sintering temperature of the negative electrode is between 600 and 1000° C.

11. The lithium-ion secondary battery of claim 1, wherein the graphite has an R value of 0.4 or less.

12. A lithium-ion secondary battery having a battery capacity of 5 Ah or more, the lithium-ion secondary battery comprising:
a positive electrode comprising a positive electrode active material, a first electrically conductive member, a first binder, and a first charge collecting member;
a negative electrode comprising a negative electrode active material, a second electrically conductive member, a second binder, and a second charge collecting member; and
an electrolyte containing an electrolytic salt,
wherein an electrical resistivity of a mixture of the positive electrode active material, the first electrically conductive member, and the first binder is 0.1 Ωcm or more but 1 Ωcm or less, the positive and negative electrodes each have an electrical capacity of 10 mAh or more but 50 mAh or less per volume of a rectangular parallelepiped that has a 1 cm² square base on a face of the electrode of one polarity facing the electrode of the other polarity and that has a height equal to a thickness of the electrode of the one polarity at the square base, a capacity ratio of the negative electrode to the positive electrode is 1 or more but 1.5 or less, and the negative electrode is formed by sintering negative electrode ingredients including graphite powder, non-graphitizing carbon, and fibrous powder in pores of a porous metal structure used as the second charge collecting member and wherein the graphite has an R value of 0.

13. The lithium-ion secondary battery of claim 12,
wherein a porosity of the porous metal structure is 75% or more but 98% or less.

14. The lithium-ion secondary battery of claim 12,
wherein the porous metal structure is formed of a material selected from the group consisting of iron, cobalt, nickel, and an alloy thereof.

15. The lithium-ion secondary battery of claim 14,
wherein the porous metal structure is nickel foam.

16. The lithium-ion secondary battery of claim 12,
wherein the non-graphitizing carbon is a carboxymethylcellulose polymer or a polymer of carboxymethylcellulose derivative.

17. The lithium-ion secondary battery of claim 12,
wherein the fibrous powder is powder of highly graphitized carbon fiber.

18. The lithium-ion secondary battery of claim 12,
wherein a fiber diameter of the fibrous powder is between 0.1 and 80 μm.

19. The lithium-ion secondary battery of claim 12,
wherein the graphite powder exhibits, when subjected to wide-angle X-ray diffractometry, an average interplanar spacing of (002) plane of between 0.335 and 0.340 nm, a crystallite thickness in (002) plane direction of 10 nm or more, and a crystallite thickness in (110) plane direction of 10 nm or more.

20. The lithium-ion secondary battery of claim 12,
wherein a particle size of the graphite powder is not more than 80 μm.

21. The lithium-ion secondary battery of claim 12,
wherein a sintering temperature of the negative electrode is between 600 and 1000° C.

\* \* \* \* \*